United States Patent [19]
Gruodis

[11] 3,913,727
[45] Oct. 21, 1975

[54] TAKE-UP CLEAT

[75] Inventor: Romualdas K. Gruodis, Mount Airy, Md.

[73] Assignee: Fairchild Industries, Inc., Germantown, Md.

[22] Filed: Oct. 31, 1973

[21] Appl. No.: 411,233

[52] U.S. Cl. ............... 198/199; 198/208; 198/202; 195/175
[51] Int. Cl.² .................................. B65G 15/44
[58] Field of Search ........ 198/197, 198, 199, 208, 198/137, 174, 202, 175

[56] References Cited
UNITED STATES PATENTS

| | | | |
|---|---|---|---|
| 856,620 | 6/1907 | Clarke | 198/208 X |
| 1,339,646 | 5/1920 | Frey | 198/199 |
| 1,405,312 | 1/1922 | Miller | 198/199 |
| 1,627,354 | 5/1927 | Thorsten | 198/199 |
| 3,051,299 | 8/1962 | Stoner | 198/208 |
| 3,675,482 | 7/1972 | Hewitt | 198/208 X |
| 3,805,948 | 4/1974 | Musser | 198/199 |

*Primary Examiner*—James B. Marbert
*Assistant Examiner*—Richard K. Thomson
*Attorney, Agent, or Firm*—Michael W. York

[57] ABSTRACT

A cleat for use on a conveyor belt for taking up undesired slack in the belt. The take-up cleat has a housing formed by two parallel slightly separated rods, and end plates connected to the respective ends of the rods. A rod is also provided which engages the underside of a portion of the conveyor belt and forces the portion of the belt between the two parallel rods. An adjusting screw is connected to each end plate and to the respective adjacent end of the rod for adjusting the position of the rod and hence the amount of slack taken up by the take-up cleat. Rollers are also rotatably connected to the end plates for assisting in supporting the take-up cleat and the adjacently located portion of the conveyor belt when the take-up cleat is located on the underside of the conveyor. An attachment which has a wheel is also provided which readily permits the take-up cleat and the associated conveyor belt to be used while they are tipped or in a canted position.

4 Claims, 4 Drawing Figures

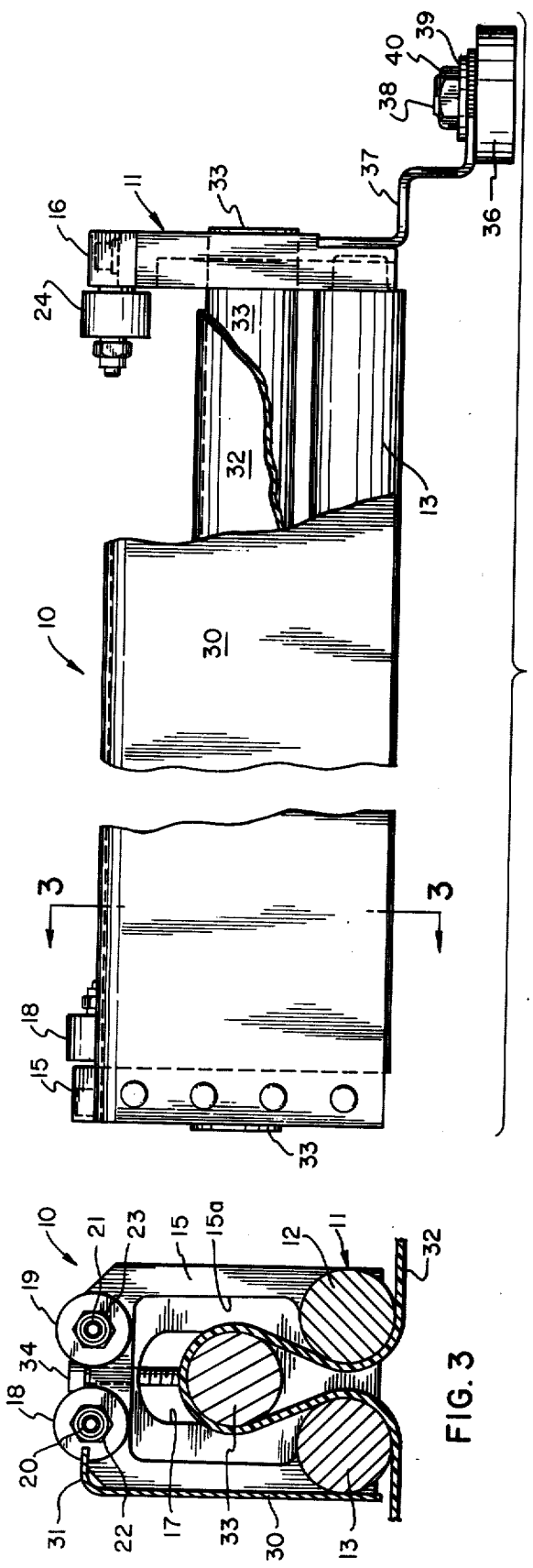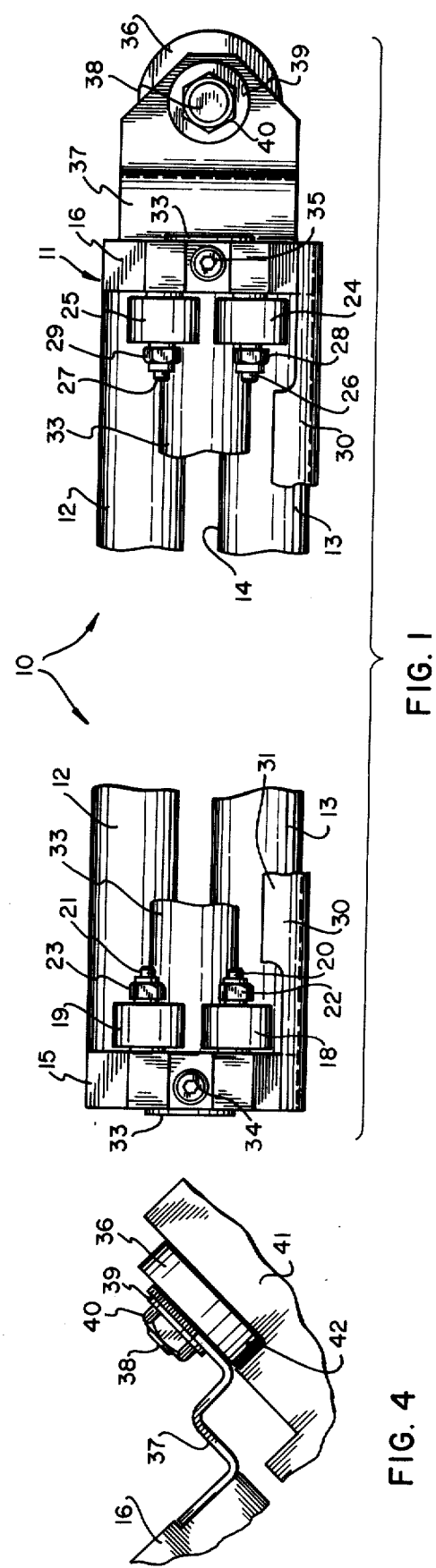

TAKE-UP CLEAT

BACKGROUND OF THE INVENTION

Conveyor belts of many different kinds and sizes have been in use for many years to transport various types of articles from one location to another. Normally, the conveyor belt is located around and is stretched between two rollers and one of the rollers is driven or caused to rotate which in turn causes movement of the conveyor belt and rotation of the other roller. A conveyor belt by its very nature must be flexible to operate and unfortunately most if not all of the flexible materials used for conveyor belts also have a tendency to stretch to some degree when pulling forces are applied to them. Consequently, when a conveyor belt is tensioned between two rollers for any extended period of time it tends to stretch. The forces exerted upon the conveyor belt by the driven roller also tend to stretch the conveyor belt. Consequently, at some point in time the conveyor belt must be replaced or have the extra slack taken up in some manner if the conveyor is to operate properly.

One common method of taking up the slack in conveyor belts is to increase the distance between the rollers which the belt surrounds until the belt has been tightened. Unfortunately, this frequently adds to the complexity and increases the cost of the conveyor. Some types of machinery also cannot tolerate any change in the location of the rollers or an increase in the overall lengthwise dimension of the conveyor. In some of these cases, it is possible to use a third adjustable roller located between the other two rollers which can be adjusted to pull a portion of the belt downward so that the slack in the belt is taken up. Again, this is likely to increase the cost and complexity of the conveyor and in some cases a change in position of a part of the lower section of the belt cannot be tolerated.

These previously mentioned problems can in some cases be partially solved by using a split belt and some type of apparatus to connect the ends of the belt which can be adjusted to decrease the overall length of the belt. The adjustment apparatus or device may however form an unacceptable or undesirable protuberance on the surface of the conveyor belt and the use of a split conveyor belt may be undesirable or give unsatisfactory results.

Some conveyors also use cleats on the conveyor belts to assist in engaging the articles which are to be conveyed or to separate the conveyor belt into various segments. The conveyor belts which are in current use by the United States Postal Service in sorting parcels have cleats which separate the conveyor belt into separate equal sections for receiving and transporting a parcel. Unfortunately, very little stretching of these sorting conveyor belts with cleats can be tolerated since proper sorting dictates that a certain fixed number of cleats pass a given point within a fixed given time when the belt is moving. The speed of the sorting conveyor belt can be varied to some degree to compensate for some minor stretching, but quite often the effective length of the belt must be reduced to maintain same window size or distance between the cleats. With prior art sorting conveyor belts and cleats it was difficult to reduce the effective length of the belt.

In certain types of parcel sorting operations it is also desirable to utilize a conveyor belt and cleats while they are canted or tipped. Unfortunately, conventional conveyors provide very little support for the conveyor belt and cleats while they are canted or tipped, thus causing belt edge wear, or causing the belt to ride up on the conveyor side guards and sometimes roll upon itself.

These deficiencies with prior art conveyor belts have now been greatly reduced through the use of the take-up cleat of the present invention which provides a cleat with an effective mechanism for taking up slack in a conveyor belt and permits the cleat and belt to be readily canted.

BRIEF DESCRIPTION OF THE INVENTION

This invention relates to devices for taking up the slack in conveyor belts and more particularly to devices for taking up the slack in conveyor belts which are located on the conveyor belt.

It is an object of the present invention to provide a cleat for a conveyor belt which has the capability of taking up the slack in the conveyor belt.

It is the object of the present invention to provide a take-up cleat which is particularly useful for taking up slack in conveyor belts in order to maintain or adjust the distance between conveyor cleats.

It is an object of the present invention to provide a take-up cleat which is particularly useful for taking up the slack in conveyor belts used in parcel sorting systems.

It is also an object of the present invention to provide a take-up cleat which is capable of taking up the slack in a conveyor belt without any adjustment of the take-up rollers which are in contact with the belt.

It is a further object of the present invention to provide a take-up cleat which is capable of taking up the slack in a conveyor belt without requiring the use of any separate adjusting take-up roller.

It is also a further object of the present invention to provide a take-up cleat which eliminates any requirement for a split belt, or cutting or splicing of the conveyor belt in order to take up the slack in the belt.

It is also a further object of the invention to provide a take-up cleat that does not destroy belt continuity such as would result if belt is pierced or drilled for cleat attachment.

It is also a further object of the present invention to provide a take-up cleat which is capable of taking up the slack in a conveyor belt without causing damage to the conveyor belt.

It is a further object of the present invention to provide a take-up cleat which is capable of being rapidly adjusted to take up the slack in a conveyor belt.

It is a further object of the present invention to provide a take-up cleat which has a continuous fine adjustment.

It is also a further object of the present invention to provide a take-up cleat which does not require the removal of any regular cleats from the conveyor belt in order to take up the slack in the conveyor belt.

It is also a further object of the present invention to provide a take-up cleat which does not require adhesive or vulcanization to attach it to a conveyor belt.

It is also a further object of the present invention to provide a take-up cleat which is capable of supporting a portion of the conveyor belt while it is in operation.

It is a further object of the present invention to provide a take-up cleat which has provisions for supporting the cleat and the attached portion of the conveyor belt while they are canted or tipped.

The present invention provides a take-up cleat for a conveyor belt including an elongated housing having an elongated opening in the lower portion thereof for receiving a portion of the conveyor belt and means for engaging the undersurface of a portion of the conveyor belt to force a portion of the conveyor belt into the elongated opening of the housing. Means for varying the position of the conveyor belt engaging means to correspondingly vary the amount of the conveyor belt forced into the elongated opening of the housing are also provided.

BRIEF DESCRIPTION OF THE DRAWINGS

The invention will be hereinafter more fully described with reference to the accompanying drawings in which:

FIG. 1 is a plan view, partly broken away, of the take-up cleat of the present invention;

FIG. 2 is a side elevational view, partly broken away, of the take-up cleat illustrated in FIG. 1 showing the cleat in use on a portion of a conveyor belt;

FIG. 3 is a sectional view of the structure illustrated in FIG. 2 taken on the line 3—3 thereof; and FIG. 4 is a side elevational view of a portion of the structure illustrated in FIG. 2 illustrating how it is utilized to support the take-up cleat and a portion of the conveyor belt.

DETAILED DESCRIPTION OF THE PREFERRED EMBODIMENT

Referring first to FIGS. 1 through 3, the take-up cleat of the invention is illustrated and is designated generally by the number 10. The take-up cleat 10 has an elongated housing 11 which comprises two parallel rods 12 and 13 which are separated slightly to form a slot or elongated opening 14 in the lower portion of the housing, an endplate 15 which is bolted to one end of each of the rods 12 and 13 and another substantially identical endplate 16 which is bolted to the opposite end of each of the rods 12 and 13.

As illustrated in FIG. 3 for the endplate 15, each endplate has a recess, such as the recess 15a, in the central and lower portions of its inner surface to receive the edge of a conveyor belt and an elongated aperture, such as the aperture 17, extending completely through its center portion. Support rollers 18 and 19 are rotatably mounted on the inner upper portion of the endplate 15 by means of the respective bolts 20 and 21 and the respective securing nuts 22 and 23. In a similar manner, support rollers 24 and 25 are rotatably mounted on the inner upper portion of the endplate 16 by means of the respective bolts 26 and 27 and the respective securing nuts 28 and 29. These support rollers 18, 19, 24 and 25 are adapted to support the entire take-up cleat 10 and a portion of any connected conveyor belt by contacting a suitable surface (not shown) underneath the belt when the portion of the belt and the take-up cleat are located on the underside of the conveyor.

A thin article engaging plate 30 is connected to the forward or leading edge of the housing 11 by having its respective ends being secured to the forward edge of the respective endplates 15 and 16 by suitable means, such as riveting, which are known in the art. The article engaging plate 30 has a bent in lip portion 31 near its upper edge which is designed to strengthen the article engaging plate and to eliminate sharp edges or corners which might cause damage to articles such as packages which come into contact with the article engaging plate.

Means for engaging the undersurface of a portion of a conveyor belt, such as the conveyor belt portion 32 illustrated in FIGS. 2 and 3, to force a portion of a conveyor belt into the slot or opening 14 comprising a movable rod 33 is connected to the housing 11 by means connected to the housing and the conveyor belt engaging means for varying the position of the conveyor belt engaging means to correspondingly vary the amount of the conveyor belt forced into the elongated opening 14 comprising the screws 34 and 35. As illustrated in FIG. 3, the screw 34 passes through an aperture in the upper portion of the endplate 15 and extends into the aperture 17 where its threaded end engages the threads in a suitable hole in one end of the rod 33 which is free to move in the elongated aperture 17. In a similar manner, the screw 35 passes through an aperture in the upper portion of the endplate 16 and has its end threaded into a suitable hole in the opposite end of the rod 33 which is also free to move in an elongated aperture in the endplate 16. Since the screws 15 and 16 are threaded into the respective ends of the rod 33, the screws can be turned to either move the rod 33 away from or closer to the rods 12 and 13. The movement of the rod 33 away from the rods 12 and 13 as best illustrated in FIG. 3 results in the taking up of the slack in the conveyor belt 32 by pulling a portion of the belt 32 upward between the rods 12 and 13. Of course, the rod 33 can be moved in the opposite manner toward the rods 12 and 13 to increase the available slack in the belt 32.

Means for assisting in supporting the take-up cleat 10 and associated conveyor belt portion 32 when the cleat and the belt are utilized where they are maintained in a tipped or canted position comprising the wheel 36 and wheel positioning bracket 37 are illustrated in FIGS. 1, 2 and 4. The wheel 36 is rotatably mounted to the bracket 37 by a bolt 38, washer 39 and a suitable nut 40 and the other end of the bracket 37 is connected by means known in the art to the lower edge of the endplate 16. The bracket 37 is formed to hold the wheel 36 below the housing 11 with the flat side of the wheel lying in a plane which is substantially parallel to the plane in which the long axes of the rods 12 and 13 lie and parallel to the plane in which the adjacent ungathered portion of the belt 32 lies.

The manner in which the wheel 36 is utilized to support the take-up cleat 10 and the adjacently located belt 32 is illustrated in FIG. 4. FIG. 4 shows the wheel 36, bracket 37 and adjacent portion of the endplate 16 in a position as it would be when the conveyor belt and take-up cleat are used in a canted or tipped position. A canted or tipped belt with cleats is now being used by the U.S Postal Service in connection with the sorting of packages.

As illustrated in FIG. 4, a support member 41 is utilized in conjunction with the wheel 36 and the outer rim of the wheel rides on the flat surface 42 of the support member so that the wheel and the bracket 37 which is connected to the endplate 16 or the take-up cleat 10, hold, or support the take-up cleat and prevent it and the adjacently located belt 32 from sagging or moving downward. It will, of course, be appreciated that the wheel 36 will contact a surface which is similar to the surface 42 when the take-up cleat 10 and the adjacent portion of the belt 32 is located on the underside of the tipped or canted conveyor so that the cleat and adjacently located portion of the belt are also supported when they are located on the underside of the conveyor.

Generally, it is contemplated that a plurality of take-up cleats 10 having the attached bracket 37 and rotatably mounted wheel 36 would be used on a conveyor belt. These take-up cleats 10 could be uniformly spaced along the belt and could also be separated from each other by conventional cleats (not shown) which did not have the take-up feature or a wheel 36 and positioning bracket 37. Normally, in this situation, the wheels 36 and brackets 37 of the uniformly spaced take-up cleats 10 would be sufficient to support the entire canted or tipped conveyor belt.

In order to use the invention, the screws 34 and 35 are unscrewed so that the ends of the screws disengaged the respective ends of the rod or bar 33 so that it can be removed from the housing 11. The housing 11 is then placed on top of the conveyor belt where it is desired to locate the take-up cleat 10 and a portion of the belt 32 is pushed upward through the slot 14 which is located between the parallel rods 12 and 13. Should the belt 32 be too stiff to permit it to be pushed upward through the slot 14, either one or both of the rods 12 and 13 can be removed. The portion of the belt 32 would then be pushed upward and the rods 12 or 13 would be replaced. The rod 33 is then pushed through one of the elongated apertures in the endplates 15 or 16, such as the aperture 17, and passed underneath the portion of the conveyor belt which has been pushed upward or through the slot 14. The ends of the screws 34 and 35 are inserted in the respective threaded holes in the ends of the rod 33 and the screws 34 and 35 are then tightened until the connected rod 33 exerts a sufficient force upon the conveyor belt portion 32. After the conveyor belt has been placed in use, additional slack in the belt can be eliminated by tightening the screws 34 and 35 to increase the tension exerted by the rod 33 on the conveyor belt 32. Since the screws 34 and 35 which comprise the position varying means are continuously variable within their effective lengths, a very precise adjustment in tension on the belt is possible.

It should be noted that the take-up cleat 10 should always be located on the conveyor belt with the plate 30 facing the intended direction of travel for the conveyor belt since this smooth flat plate is designed to engage and move any articles on the conveyor. It the conveyor belt is to be used while it is inclined or tipped, the wheels 36 will also be located on a support member, such as the support member 41, in the manner previously described in relation to FIG. 4. The take-up cleat 10 can easily be removed from the conveyor belt whenever it is desired by merely unscrewing the screws 34 and 35 until they disengage the rod 33 and by removing the rod 33 from underneath the adjacent portion of the conveyor belt.

Although the invention has been described in considerable detail with reference to a certain preferred embodiment it will be understood that variations and modifications may be made within the spirit and scope of the invention as defined in the appended claims.

What is claimed is:

1. A take-up cleat for a conveyor belt comprising an elongated housing having an elongated opening in the lower portion thereof for receiving a portion of said conveyor belt comprising two cylindrical members which define the long edges of the elongated opening in the lower portion of said housing, means for engaging the undersurface of a portion of the conveyor belt to force a portion of the conveyor belt into the elongated opening of said housing comprising another cylindrical member located near said first two cylindrical members and means connected to said housing and to said conveyor belt engaging means for varying the position of said conveyor belt engaging means to correspondingly vary the amount of the conveyor belt forced into the elongated opening of said housing.

2. The take-up cleat of claim 1 further comprising means connected to said housing for assisting in supporting the take-up cleat and the adjacently located portion of the conveyor belt when they are located in a tipped or canted position, said tipped or canted supporting means including a wheel having a flat side, said wheel being so positioned that the flat side thereof is located in a plane substantially parallel to the plane in which the long axes of said cylindrical members which define the elongated opening in the lower portion of said housing lie.

3. The take-up cleat of claim 1 further comprising means connected to said housing for assisting in supporting the take-up cleat and the adjacently located portion of the conveyor belt when they are located in a tipped or canted position, said supporting means comprising a member projecting outwardly from one end of said housing and a wheel mounted on the outer end portion of said projecting member.

4. The take-up cleat of claim 3 comprising a support member having a canted surface and wherein the outer rim of said wheel is adapted to ride on said canted surface.

* * * * *